UNITED STATES PATENT OFFICE.

RUDOLF HENSE, OF CHARLOTTENBURG, GERMANY.

PROCESS FOR OBTAINING A CHARGE LIQUID PARTICULARLY ADAPTED FOR EXPLOSION-MOTORS FROM LIQUID HYDROCARBONS.

1,073,233.  Specification of Letters Patent. Patented Sept. 16, 1913.

No Drawing. Application filed June 20, 1908. Serial No. 439,493.

*To all whom it may concern:*

Be it known that I, RUDOLF HENSE, chemist, a subject of the King of Prussia, residing at No. 22 Leonhardstrasse, Charlottenburg, in the Kingdom of Prussia, Empire of Germany, have invented certain new and useful improvements in processes for obtaining a charge liquid particularly adapted for explosion-motors from liquid hydrocarbons; and I do hereby declare the following to be a full, clear, and exact description of the invention, such as will enable others skilled in the art to which it appertains to make and use the same.

The object of my present invention is to obtain an easily volatilizable and uniformly gasifying combustible particularly adapted for explosion-motors, by mixing easily volatilizable liquid hydrocarbons, such as benzol or similar products of the coal and tar distillation, as well as carbonic bodies and nitro bodies with difficultly volatilizable liquid hydrocarbons, such as earth-oil, crude naphtha, raw or distilled petroleum. The resulting liquid can be gasified in the same profitable manner by any kind of gasifier.

Hitherto it has often been tried to mix benzin with the cheaper benzol to obtain a combustible for explosion-motors, but the resulting mixture did not answer the requirements, because both liquids do not gasify uniformly at the same temperature, so that they cannot be advantageously employed in the same gasifier.

To avoid these drawbacks and to obtain a very volatile and uniformly gasifying combustible of high value which shall be particularly well adapted for explosion-motors, is the object of my present invention. To this end I add to a heavy hydrocarbon distilling at a high temperature some caustic soda and mix with this product a liquid hydrocarbon distilling at a lower temperature. To the resulting mixture are then added a rosin for instance colophony, as well as nitro compounds like picric-acid, of which mixture the clear part is drawn off and subjected to a fractional distillation to obtain the desired liquid combustible of high value at temperatures up to 250° C. The distillation is then continued up to 300° C., at which temperature the distillation of the mixture may be regarded as finished. If the liquid thus obtained is enriched by about 25% of a distillate which was obtained firstly by a distillation of the liquid up to 150°, a mixture is produced far better adapted for many industrial purposes than the natural oil of turpentine. To illustrate this more clearly it may be stated that to 100 pounds of petroleum are added 20 pounds of benzene ($C_6H_6$) after which to this mixture half a pound of caustic potash is added and the resulting mixture is thoroughly stirred. After this mixture has been left to settle for about 6 hours, the formed sediment is taken off. In the meantime about 5 pounds of colophony and 1.6 ounce of picric-acid are dissolved in benzene each in separate vessels. Instead of benzene a part of the first prepared mixture of petroleum and benzene without the caustic potash can be used.

The rosin-solution is added firstly to the first prepared mixture and afterward the picric-acid-solution is added. The picric-acid-solution can also be added firstly to the rosin-solution and this product then be poured into the first prepared mixture. It must be mentioned that it is necessary in the first manner of mixing to add the rosin-solution firstly and in the second manner of mixing to pour out the picric-acid-solution firstly into the rosin-solution. The pouring out must take place in a thin jet and during this the mixture must be stirred continually. The stirring is continued till the mixture gets a reddish color. Then 1.6 ounce of English sulfuric-acid of 66% and the same quantity of desiccated Glauber salt is added by pouring said liquids in a thin jet into the mixture under continual stirring same. After this mixture has settled for 24 hours, it is drawn off and then about 3.5 ounces of amyl-acetate are added to destroy the bad smell, for which latter purpose said amyl-acetate is usually employed. After this the mixture is subjected to a fractional distillation to obtain therefrom the desired combustible at temperature up to 250° C. and other valuable products of higher boiling points. The part of the mixture, which distils at a higher temperature and which remains after the combustible has been removed by distillation, can be advantageously employed as a fat-dissolver and as a substitute for turpentine. The characteristic feature of my present invention consists therein, that for reasons of the accomplished homogeneous mixing of the ingredients this distillation proceeds on a uniformly ascending curve, i. e. the temperature rises during the distilling operation without interruptions, and further consists therein that the splitting up of the mixture into its components does not take place. If for instance to this mixture 20% of light hydrocarbons are added, up to 40% of the new product distils over at the temperature of evaporation of said mixture; or in other words, the product obtained in accordance with my present invention does not behave like products not treated in the described manner, inasmuch as the lower distilling fraction predominates to such a degree, that for instance up to a temperature of 160° C. about 40% more of the distillate will be produced than possibly can be obtained when the mixture is not treated according to my present invention. The addition of alkali and rosin to the mixtures of hydrocarbons has for its purpose to form a rosin-soap which is adapted to envelop the paraffin constituents of the petroleum in form of a rosin-soap-emulsion, to unite with this emulsion and to precipitate the same. After this emulsion has settled the mixture of the purified hydrocarbon can easily be separated from the emulsion. By this purification of the hydrocarbon mixture together with the subsequent fractional distillation is obtained that the hydrocarbons are free from paraffin constituents, so that a complete gasification of the hydrocarbons can take place without dirtying or corroding the motors. In order to intensify the gasification of the combustible a small percentage of compounds of the nitro ($NO_2$) group such as picric-acid is added to the mixture. It has been proved, that small quantities of picric-acid are sufficient to nitrate the hydrocarbons and that in this manner compounds of the nitro ($NO_2$) group can be added to the combustibles whereby the gasification of the admixed petroleum is made possible. Below the products obtained by this distillation are given according to their fractions, which take place at different boiling-points, and their advantages are enumerated.

The fraction which takes place below 250° C. produces the liquid which is particularly well adapted to be employed as a liquid combustible for explosion-motors and possesses the following advantages:—1. The liquid as such is almost scentless and tasteless, and is completely scentless during gasification. 2. The products of gasification are comparatively cool and non-corrosive, so that the motor is not nearly as much heated and corroded as when the usual hydrocarbons are employed. 3. The gasification of the liquid is accomplished without any residue, also without corroding the motor and without clogging it with soot. 4. The exploding-capacity is still satisfactory at a temperature of —18° to —20° C., whereas benzin fails to explode regularly at about —10° C. 5. The starting of the motor is accomplished far easier as when benzin is employed. 6. The effect of the explosion of the combustible is about 30% greater than by benzin, when the existing benzin—, benzene— or similar motors are employed. 7. The specific gravity can be varied considerably according to the percentual changes of the additions made, without causing the enumerated advantages to suffer, if suitable proportions of their quantities are observed. 8. The liquid is proof against explosion and can only be brought to explosion by means of an igniting-flame or flash-light, as for instance by an electric spark. 9. The combustion requires an essentially smaller supply of air or oxygen. 10. The expenses of producing said liquid are considerably lower than those of the benzin. The products of the fraction which takes place between 250° to 300° C. can be most advantageously used as a substitute for turpentine for the extraction of fat from bones and the like. When to these products up to 25% of the first obtained distillate are added, a liquid is obtained, which possesses qualities far better adapted for the manufacture of lacs, printing-colors, boot- and shoe-creams and the like, than those of the natural turpentine-oil.

Under benzin, as employed in the present application, is to be understood the first product obtained by distilling crude petroleum.

I claim:—

1. Process for obtaining a combustible of high value, consisting in adding light hydrocarbon to heavy hydrocarbon distilling at a high temperature, mixing this product with caustic potash, settling this mixture, taking off the sediment, adding to the resulting mixture rosin substances as colophony and compounds of the nitro ($NO_2$) group as picric-acid, settling this mixture, drawing off the liquid and purifying and clearing this hydrocarbon by fractional distillation.

2. Process for obtaining a combustible of high value, consisting in adding light hydrocarbon to heavy hydrocarbon distilling at a high temperature, mixing this product with caustic potash, settling this mixture, taking off the sediment, adding to the resulting mixture rosin substances as colophony and compounds of the nitro ($NO_2$) group as picric-acid, settling this mixture, drawing off the clear part of said mixture and obtaining said combustible by distilling the drawn-off mixture at temperatures up to 250° C.

3. Process for obtaining a combustible of high value, consisting in adding light hydrocarbon to heavy hydrocarbon distilling at a high temperature, mixing this product with caustic potash, settling this mixture, taking off the sediment, adding to the resulting mixture rosin substances as colophony and compounds of the nitro ($NO_2$) group as picric-acid, settling this mixture, drawing off the clear part of said mixture, purifying this hydrocarbon by adding sulfuric-acid and Glauber salt and decanting the formed sediment and purifying the liquid by fractional distillation at temperatures up to 250° C.

4. Process for obtaining a combustible of high value and a substitute for turpentine, consisting in adding light hydrocarbon to the heavy hydrocarbon distilling at a high temperature, mixing this product with caustic potash, settling this mixture, taking off the sediment, adding to the resulting mixture rosin substances as colophony and compounds of the nitro ($NO_2$) group as picric-acid, settling this mixture, drawing off the clear part of said mixture, distilling the liquid at temperatures up to 250° C., gathering the distillate, distilling and condensing same at temperatures up to 300° C. and mixing 25% of the first obtained distillate with the latter.

In testimony whereof I have signed my name to this specification in the presence of two subscribing witnesses.

RUDOLF HENSE.

Witnesses:
 WOLDEMAR HAUPT,
 HENRY HASPER.